(12) United States Patent
Kurokawa et al.

(10) Patent No.: US 6,956,809 B2
(45) Date of Patent: Oct. 18, 2005

(54) MULTILAYER PHASE-CHANGE TYPE OPTICAL DISC CAPABLE OF RECORDING AND REPRODUCING INFORMATION AT HIGH TRANSFER RATE

(75) Inventors: Kotaro Kurokawa, Kanagawa (JP); Koichi Yasuda, Tokyo (JP)

(73) Assignee: Sony Corporation, Tokyo (JP)

( * ) Notice: Subject to any disclaimer, the term of this patent is extended or adjusted under 35 U.S.C. 154(b) by 49 days.

(21) Appl. No.: 10/296,119

(22) PCT Filed: Mar. 20, 2002

(86) PCT No.: PCT/JP02/02707

§ 371 (c)(1),
(2), (4) Date: May 9, 2003

(87) PCT Pub. No.: WO02/076757

PCT Pub. Date: Oct. 3, 2002

(65) Prior Publication Data

US 2003/0169675 A1 Sep. 11, 2003

(30) Foreign Application Priority Data

Mar. 23, 2001 (JP) .......................................... 2001-85854

(51) Int. Cl.⁷ ................................................ G11B 7/24
(52) U.S. Cl. ............................... 369/275.2; 369/275.1; 428/64.4; 430/270.13
(58) Field of Search ........................... 369/275.1, 275.2, 369/275.4, 94, 281, 280, 286, 283; 428/64.4, 64.1, 64.3; 430/270.13, 321, 320

(56) References Cited

U.S. PATENT DOCUMENTS

| | | | | |
|---|---|---|---|---|
| 5,959,961 A | * | 9/1999 | Matsui | 369/275.1 |
| 6,127,049 A | * | 10/2000 | Zhou et al. | 369/288 |
| 6,160,787 A | * | 12/2000 | Marquardt et al. | 369/275.1 |
| 6,312,780 B1 | * | 11/2001 | Kasami et al. | 369/288 |
| 6,632,583 B2 | * | 10/2003 | Kunitomo et al. | 369/275.2 |
| 6,667,947 B2 | * | 12/2003 | Maeda et al. | 369/275.1 |
| 6,807,142 B1 | * | 10/2004 | Nagata et al. | 369/275.2 |
| 2003/0143365 A1 | * | 7/2003 | Ito et al. | 369/275.1 |

FOREIGN PATENT DOCUMENTS

| | | |
|---|---|---|
| EP | 957476 | 11/1999 |
| JP | 05-182238 | 7/1993 |
| JP | 10-505188 | 5/1998 |
| JP | 11-240250 | 9/1999 |
| JP | 2000-43415 | 2/2000 |
| JP | 2000-268403 | 9/2000 |
| WO | WO 96/31875 | 10/1996 |

* cited by examiner

*Primary Examiner*—Tan Dinh
(74) *Attorney, Agent, or Firm*—Sonnenschein, Nath & Rosenthal LLP (57) ABSTRACT

The present invention is a multilayer optical disc formed of a plurality of information recording sections having a phase change recording layer. A first information recording section provided at a laser-incident side uses, as a recording material, a phase change recording material which uses Sb and Te as major components and satisfies their ratio of $2.3 < Sb/Te \leq 4.0$ according to the atomic ratio. Since this phase change recording material provides a fast crystallization speed, it is possible to stably record, reproduce, and rewrite an information signal at a high transfer rate.

10 Claims, 7 Drawing Sheets

MULTILAYER PHASE-CHANGE TYPE OPTICAL DISC CAPABLE OF RECORDING AND REPRODUCING INFORMATION AT HIGH TRANSFER RATE

BACKGROUND OF THE INVENTION

The present invention relates to a multilayer optical disc formed of a plurality of information recording sections layered in a multilayer fashion. More specifically, the present invention relates to a multilayer optical disc at least having a phase change recording layer formed of a phase change recording material.

With development of information communication devices, there is a need for optical discs having much more recording capacities as recording medium for this kind of devices. A DVD (Digital Versatile Disc) is an example of optical discs intended for an increased recording capacity. There is provided a read-only DVD with the recording capacity of 8.5 Gbytes by using two layers of information recording section. Further, there is provided a read/write DVD capable of rewriting of information signals with the recording capacity of 5.2 Gbytes and with only one layer of a recording section.

An optical disc with the recording capacity of 8 Gbytes is needed for recording four hours of a television program according to the NTSC (National Television System Committee) system. An optical disc with the recording capacity of 24 Gbytes is needed for recording two hours of a television program according to the high-definition broadcast.

The amount of information to be handled is increasing with the development of digital information communication systems. There is an increasing demand for high-density and high-capacity media for recording a large amount of information Particularly, there is a need for high-density and high-capacity optical discs.

In order to improve the recording density and increase the capacity of information to be recorded on optical discs, it is necessary to shorten the wavelength of laser used for recording or reproducing information signals on an optical disc and to increase a numerical aperture (NA) of an objective lens for condensing the laser on a signal recording surface of the optical disc. In order to record or reproduce information signals from such optical disc designed for high density and capacity, there is proposed a recording and reproducing apparatus which uses laser with the wavelength of approximately 400 nm and an objective lens for condensing this laser with the numerical aperture (NA) of approximately 0.6. Alternatively, in order to comply with high-density and high-capacity optical discs, there is proposed a recording and reproducing apparatus which uses laser with the wavelength of approximately 660 nm and an objective lens for condensing this laser with the numerical aperture (NA) of approximately 0.85. Further, in order to comply with high-density and high-capacity optical discs, there is proposed a recording and reproducing apparatus which uses laser with the wavelength of approximately 400 nm and an objective lens for condensing this laser with the numerical aperture (NA) of approximately 0.85.

There is proposed a DVD configured as a recording and reproducing optical disc designed for high-capacity by forming two layers of an information recording section made of a phase change recording material.

When an optical disc comprises a 2-layer information recording section, each section is composed of a phase change recording material based on stoichiometric compositions such as Ge:Sb:Te=2:2:5 (atomic ratio). In order to further increase the recording capacity and provide a high transfer rate for the optical disc which forms an information recording section by using the phase change recording material, it is necessary to use a crystallization accelerating layer for the information recording section and further use a technique called the absorptivity control.

Here, the crystallization accelerating layer is a dielectric layer which has a capability of accelerating crystallization of the phase change recording material by contact with this material. Accordingly, the crystallization accelerating layer is provided on the optical disc so as to contact the phase change recording material. Materials used for forming the crystallization accelerating layer include dielectric materials such as $Si_3N_4$, GeN, etc. which show poor wettability with a molten phase change recording material.

In order to increase the capacity and the density of optical discs, it may be considered to shorten the wavelength of laser used for recording and reproducing information signals, increase the numerical aperture (NA) of an objective lens for condensing the laser, decrease the diameter of a beam spot formed on the optical disc's signal recording surface, and increase the optical disc's rotational speed for a higher transfer rate. These conditions shorten the time for allowing a laser's beam spot to pass a given point on the information recording section. As a result, when the laser is irradiated to the phase change recording material to record an information signal, the time for heating up the recording material becomes short.

To record an information signal on the information recording section using the phase change recording material, it is necessary to crystallize an amorphous region corresponding to the information signal to be recorded. This method records information signals by irradiating the laser to an amorphous portion of the recording material layer using a so-called bias power for heat-melting, and then cooling that portion for crystallization.

When an information signal is recorded on the information recording section using the phase change recording material, an insufficient speed of crystallization for the region melted by irradiation of the laser makes it impossible to record the information signal at a high transfer rate. In order to record information signals on the information recording section using the phase change recording material at a high transfer rate and at a high density, it is necessary to form the recording material layer so as to contact the crystallization accelerating layer for improving the crystallization speed after the melting.

An absorptivity control technique employed for increasing the capacity and the density of optical discs having the information recording section using the phase change recording material controls light absorption coefficient Ac for crystallization and light absorption coefficient Aa for amorphism of a phase change material layer. The technique provides control so as to satisfy $Ac/Aa \geq 1.0$ for the relationship between light absorption coefficient Ac for crystallization and light absorption coefficient Aa for amorphism. Desirably, control is provided to satisfy $Ac/Aa \geq 1.2$.

Generally, the phase change recording material causes the temperature to rise differently depending on crystalline and amorphous states in response to the supplied energy. The temperature rises rapidly during amorphism.

When additional information is overwritten to the information recording section where an information signal is already recorded, the information signal is recorded by irradiating the laser to a region mixedly comprising an amorphous and crystalline regions under the same condition. Namely, the laser is irradiated simultaneously to the amorphous and crystalline regions to melt and then crystallize these regions for recording the information signal. At this time, when there is the relationship of Ac/Aa<1.0 between light absorption coefficient Ac in a crystalline state and light absorption coefficient Aa in an amorphous state, the amorphous region's ultimate temperature becomes higher than the crystalline region's ultimate temperature. That is, under the condition of Ac/Aa<1.0, a recording mark is formed differently on the phase change recording material layer before recording depending on whether it is crystalline or amorphous. This deteriorates a jitter value as an evaluation function generally used for the reproduction signal evaluation, impairs reproduction characteristics of reproduction signals, and disables reproduction of the recorded information signal with good reproduction characteristics. To solve these problems, there was proposed an absorptivity control technique for providing control so as to satisfy Ac/Aa≧1.0 for the relationship between light absorption coefficient Ac in a crystalline state of the recording material layer and light absorption coefficient Aa in an amorphous state thereof.

The inventors formed a recording layer using the phase change recording material of Ge:Sb:Te=2:2:5 and formed a two-layer information recording section comprising a crystallization accelerating layer provided on the recording layer. Further, the inventors created a multilayer optical disc and examined its characteristic by controlling the relationship between light absorption coefficient Ac in a crystalline state of the above-mentioned recording material layer and light absorption coefficient Aa in an amorphous state thereof.

We irradiated the laser with the wavelength of approximately 400 nm to the optical disc by using an objective lens with the numerical aperture (NA) of 0.85 to obtain recording characteristics for each information recording section. As a result, we found that it is difficult to produce a transfer rate of 30 Mbps or more in one of the two layered information recording sections located at the laser's incident side. This seems to be caused by difficulty of controlling the relationship between light absorption coefficient Ac in a crystalline state of the recording material layer and light absorption coefficient Aa in an amorphous state thereof.

The material of Ge:Sb:Te=2:2:5 is used for the above-mentioned optical disc's recording layer and shows complex indexes of refraction to be approximately (2.0–3.0i) in a crystalline state and approximately (3.0–2.0i) in an amorphous state in response to the laser with the wavelength of approximately 400 nm. The optical disc comprises two layered information recording sections. One section is positioned at a laser-incident side. The other, i.e., the second information recording section, is positioned at a substrate side relative to the laser-incident side. In order to record and reproduce information signals on the second information recording section, it is necessary to set the optical transmittance of 40% or more for the first information recording section located at the laser-incident side. Accordingly, if a metallic layer is available to an optical disc having only one information recording section or to the second information recording section provided at the substrate side of the 2-layer structure, that metallic layer cannot be used as a recording layer for the first information recording section at the laser-incident side.

As mentioned above, the optical disc formed of two recording layers comprising the phase change recording material makes it difficult to provide Ac/Aa≧1.2 as the relationship between light absorption coefficient Ac in a crystalline state of the recording material layer and light absorption coefficient Aa in an amorphous state thereof according to conditions of an optical constant required of the recording material and the optical transmittance required of the laser-incident side. Accordingly, it is very difficult to provide a high transfer rate for each information recording section on the optical disc having a plurality of recording layers using the above-mentioned phase change recording material of Ge:Sb:Te=2:2:5.

SUMMARY OF THE INVENTION

The present invention has been made in consideration of the foregoing. It is therefore an object of the present invention to provide a multilayer optical disc capable of stably recording and reproducing information signals at a high transfer rate on each of multilayer information recording sections.

The present invention proposed to achieve the above-mentioned objects is a multilayer optical disc comprising at least a first information recording section, an intermediate layer having optical permeability, and a second information recording section sequentially formed on a substrate and using laser irradiated from a side of the first information recording section, wherein the first information recording section includes a phase change recording material layer formed of a phase change recording material which uses at least Sb and Te as major components and satisfies their ratio of 2.3<Sb/Te≦4.0 according to the atomic ratio.

It is desirable that the laser used for the multilayer optical disc according to the present invention have a wavelength of 385 nm or more and 450 nm or less.

Further, it is desirable that the second information recording section include a phase change recording material layer formed of a phase change recording material which uses at least Sb and Te as major components and satisfies their ratio of 2.3<Sb/Te≦4.0 according to the atomic ratio.

Furthermore, it is desirable that at least one of Ge, In, Zn, Sn, Ag, and Au be added to the phase change recording material layer.

It is desirable that the first information recording section include the phase change recording material layer configured to be sandwiched between a pair of dielectric layers having optical permeability.

It is desirable that at least one of the pair of dielectric layers be a single layer including at least a dielectric material having a higher thermal conductivity than $ZnS$—$SiO_2$, or a multilayer of the dielectric material having the high thermal conductivity and another transparent dielectric material.

Moreover, it is desirable that the dielectric material having the high thermal conductivity contain at least one of $Si_3N_4$, AlN, SiC, BeO, and BN as a major component.

In the multilayer optical disc according to the present invention, it is desirable that when information is recorded on all recording tracks, the first information recording section be provided with an average transmittance (Tavg) in the range of 70%≧Tavg≧40%.

Further, it is desirable that the phase change recording material be provided with a light absorption coefficient (A1c) for the first information recording section in a crystalline state and a light absorption coefficient (A1a) for the first information recording section in an amorphous state in the range of 1.7≧A1c/A1a≧0.8.

Still further, it is desirable that the phase change recording material be provided with a higher optical reflectance for the first information recording section in an amorphous state than that for first information recording section in a crystalline state.

The above configured multilayer optical disc according to the present invention includes the first information recording section having the phase change recording material layer formed of the phase change recording material which comprises at least Sb and Te as major components and satisfies their ratio of 2.3<Sb/Te≦4.0 according to the atomic ratio. This phase change recording material provides a fast crystallization speed. Accordingly, the multilayer optical disc according to the present invention is capable of stably recording, reproducing, and overwriting information signals at a high transfer rate on the first information recording section even when the laser with a short wavelength is used for recording and reproduction and the objective lens has a high NA.

The foregoing and other advantages and features of the invention will become more apparent from the detailed description of the preferred embodiments of the invention given below with reference to the accompanying drawings.

DETAILED DESCRIPTION OF THE PRESENTLY PREFERRED EMBODIMENTS

Embodiments of the present invention will be described in further detail with reference to the accompanying drawings.

Figure 1:
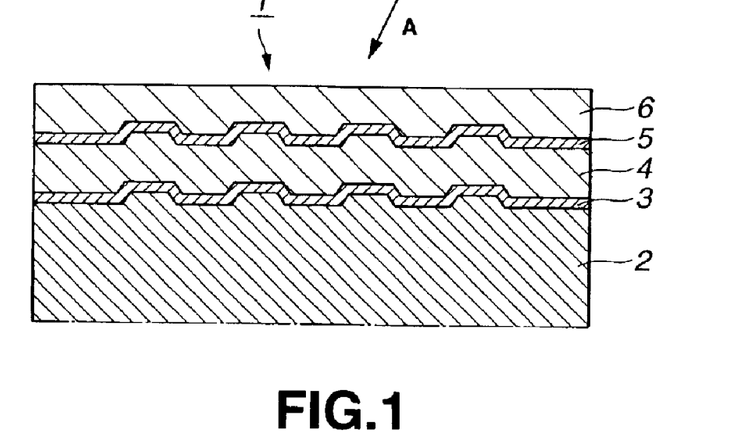
FIG. 1 is a sectional view showing the basic configuration of an optical disc embodying the present invention.

The optical disc 1 according to the present invention is a multilayer optical disc comprising two layers of information recording sections having a phase change recording layer. An optical disc 1 uses a support substrate 2 on which a guide groove is preformed. A second information recording section 3 is formed on the support substrate 2 by means of a technique such as sputtering to have the guide groove. On the second information recording section 3, there is formed a first information recording section 5 so as to have a guide groove via an intermediate layer 4 having optical permeability. An optical transmission protective layer 6 is formed on the first information recording section 5. Here, laser as a light beam for recording and reproduction enters the optical disc 1 from the side of the optical transmission protective layer 6 as indicated by arrow A in FIG. 1 The optical disc 1 according to the present invention specifies a cycle of 0.6 $\mu$m for guide grooves formed on the first information recording section 5 and the second information recording section 3, a thickness of 20 $\mu$m for the intermediate layer 4, and a thickness of 90 $\mu$m for the optical transmission protective layer 6. Table 1 below lists system conditions used for recording and reproduction according to the embodiment. The land-groove recording technique is employed to record information on both a convex guide groove (groove) and a concave guide groove (land) viewed from the laser-incident side. Namely, the actual recording track pitch is 0.3 $\mu$m, a half of the guide groove cycle.

TABLE 1

| | |
|---|---|
| Laser wavelength | 407 nm |
| Objective lens NA | 0.85 |
| Signal modulation system | 1–7 system |
| Information recording line density | 0.14 $\mu$m/bit |
| Transfer rate | 35 Mbps |

Figure 2:
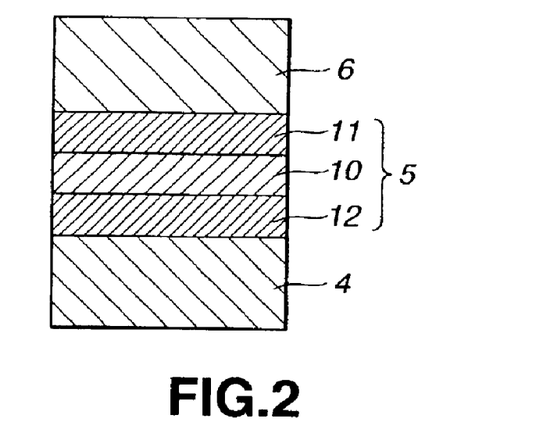
FIG. 2 is a sectional view showing a layer configuration near a first information recording section.

The first information recording section 5 will now be described. The first information recording section 5 uses Sb and Te as major components whose atomic ratio is 2.3<Sb/Te≦4.0. There is formed a phase change recording material layer made of a phase change recording material as an eutectic composition. As shown in FIG. 2, the first information recording section 5 is structured so that a first dielectric layer 11 is formed on the side of the optical transmission protective layer 6 and a second dielectric layer 12 is formed on the side of the intermediate layer 4 with a phase change recording material layer 10 made of the phase change recording material provided therebetween.

Information signals are recorded on the first phase change recording material layer 10 as follows.

The first phase change recording material layer 10 shows an amorphous state immediately after deposition when the layer is deposited by means of sputtering, for example. The first phase change recording material layer 10 in the amorphous state is heated to over the crystallization temperature for a phase change to a crystalline state (initialization). In this state, when the laser is irradiated from the side of the optical transmission protective layer 6, for example, a phase change occurs from the crystalline state to the amorphous state at a region where the laser is condensed, changing the optical reflectance. The portion with the changed optical reflectance becomes an amorphous recording pit. The amorphous recording pit is detected by using a difference between optical reflectances for the crystalline region and that pit.

The first phase change recording material layer 10 uses Sb and Te as major components and is made of a material whose atomic ratio is 2.3<Sb/Te≦4.0. By forming the first phase change recording material layer 10 using this material, the optical disc 1 can provide a high transfer rate of 30 Mbps or more to be described later.

It is desirable to add Ge, In, Zn, Sn, Ag, and Au to the phase change recording material which uses Sb and Te as major components and has the atomic ratio of 2.3<Sb/Te≦4.0. By adding these materials, the first information recording section 5 maintains the rewrite characteristic, improves the stability for saving amorphous recording marks, and allows amorphous recording marks to be hardly erased under room temperature.

The phase change recording material is characterized by a fast crystallization speed. Accordingly, the first information recording section 5 need not be provided with the crystallization accelerating layer needed for forming the phase change recording material layer by using the material of the composition Ge:Sb:Te=2:2:5, for example. By contrast, to generate an amorphous recording mark, the first information recording section 5 needs to be configured to be capable of fast cooling the heated first phase change recording material layer 10.

In order to improve the effect of cooling the first phase change recording material layer 10, it is considered to introduce a metallic layer made of a metallic material into the first information recording section 5. However, the first information recording section 5 needs to use as transparent a dielectric material as possible except the first phase change recording material layer 10. This is because the first information recording section 5 needs to provide as high optical transmittance as possible and to prevent the recording and reproducing characteristics of the first information recording section 5 itself from being degraded in order to perform recording and reproducing for the second information recording section 3. Introducing the metallic material or the like generates light absorption in the metallic layer and decreases the optical transmittance of the first information recording section 5. That is, it is undesirable to use a light-absorbent material for the first information recording section 5 except the first phase change recording material layer 10. If the light-absorbent material is used, for example, an Ag layer needs to have the film thickness of 5 nm or less.

The optical disc using the phase change recording material as a recording material makes wide use of $ZnS—SiO_2$ as a dielectric material. This is because $ZnS—SiO_2$ has advantages of a high sputter deposition rate compared to other dielectric materials, high resistance to damage due to an external force applied to the thin film, etc.

From the viewpoint of cooling the first phase change recording material layer 10, it is desirable to design the first dielectric layer 11 and the second dielectric layer 12 to use a dielectric material having a thermal conductivity capable of fast cooling the first phase change recording material layer 10, i.e., a dielectric material having a high thermal conductivity. Materials having a high thermal conductivity include $Si_3N_4$, AlN, SiC, BeO, BN, etc. Table 2 below lists thermal conductivity reference values for $ZnS—SiO_2$, $Si_3N_4$, and AlN. The thermal conductivity shows values in bulk within the following thermal conductivity ranges according to manufacturing methods.

TABLE 2

| Material name | Thermal conductivity reference value (W/m/k) |
|---|---|
| $ZnS—SiO_2$ | 0.6 |
| $Si_3N_4$ | 20–130 |
| AlN | 90–200 |

It is possible to fast cool the first phase change recording material layer 10 by forming the first dielectric layer 11 and the second dielectric layer 12 with the dielectric material having a high thermal conductivity. Recording, reproducing, and rewriting operations can be stably performed at a high transfer rate for the first information recording section 5.

It is desirable to structure the first dielectric layer 11 and the second dielectric layer 12 to be a single layer comprising $Si_3N_4$, AlN, etc. having a higher thermal conductivity than $ZnS—SiO_2$ or a multilayer of the material having a high thermal conductivity and another transparent dielectric material. It is most desirable to both dielectric layers to be transparent material layers having a high thermal conductivity as mentioned above.

Figure 3:
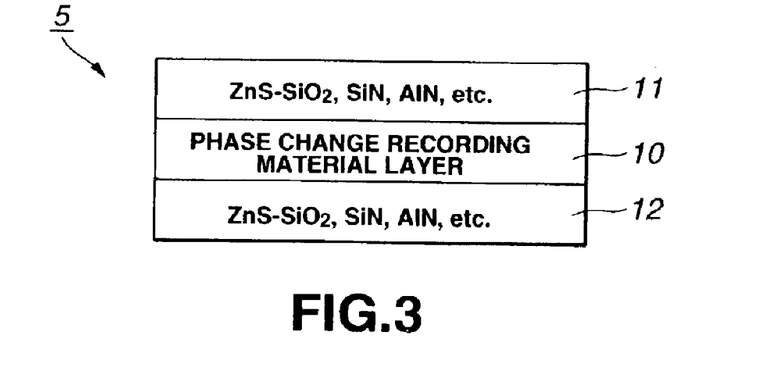
FIG. 3 schematically shows an example of a layer configuration of the first information recording section.
Figure 4:
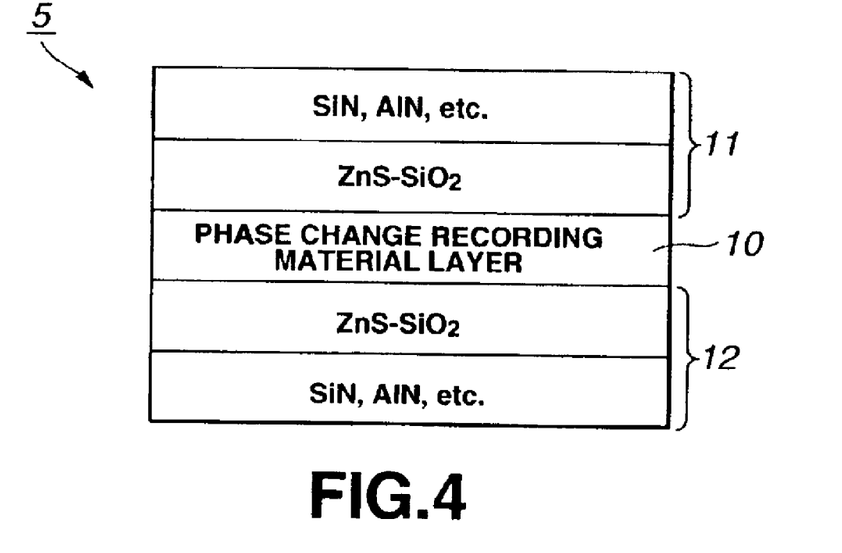
FIG. 4 schematically shows another example of a layer configuration of the first information recording section.
Figure 5:
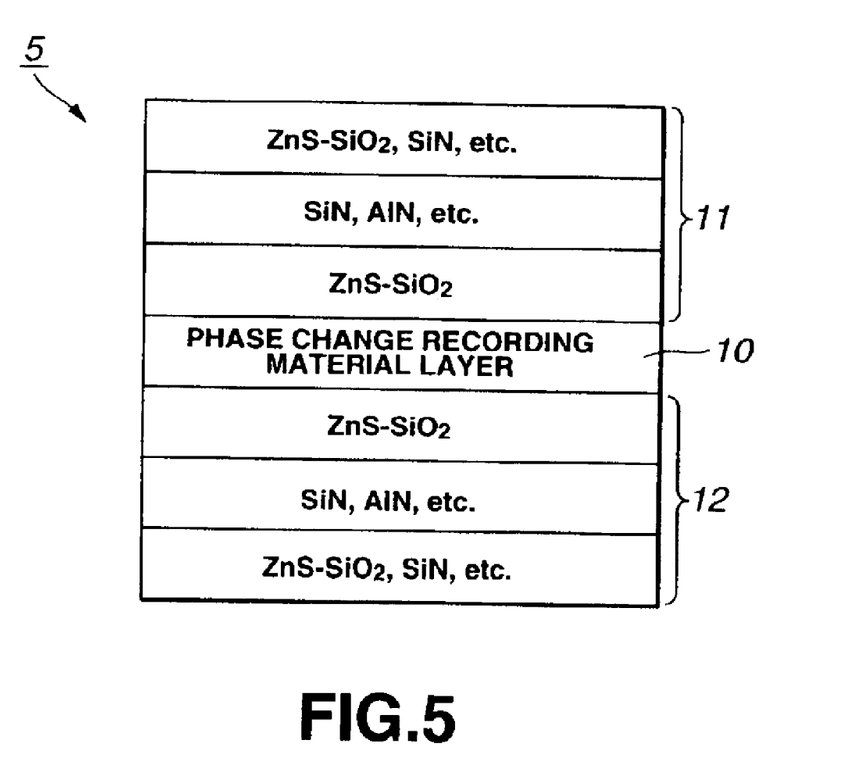
FIG. 5 schematically shows yet another example of a layer configuration of the first information recording section.

FIGS. 3 through 5 show examples of layer configurations for the first dielectric layer 11 and the second dielectric layer 12. The layer configuration examples for the first dielectric layer 11 and the second dielectric layer 12 are not limited to those shown in FIGS. 3 through 5. Optical constants of dielectric materials usable for the first information recording section 5 and optical constants with reference to the laser wavelength of 407 nm near an eutectic composition of Sb and Te.

TABLE 3

| Material name | Optical constant reference value (410 nm) | |
|---|---|---|
| $ZnS—SiO_2$ | 2.32 | |
| $Si_3N_4$ | 2.05 | |
| AlN | 2.05 | |
| $M_x (Sb_yTe_{1-y})_{1-x}$ | Crystalline | 1.5–3.3i |
| | Amorphous | 3.0–3.1i |

In the first information recording section 5, it is desirable to ensure the relationship expressed in equation 3 below as the range of an average optical transmittance (Tavg) for an optical transmittance (T1a) in an amorphous state of the phase change recording material and an optical transmittance (T1c) in a crystalline state thereof.

$$70\% \geq Tavg \geq 40\% \qquad \text{Equation 3}$$

Here, Tavg depends on the information recording systems for optical discs: Tavg=(T1c+T1a)/2 when the system records information on both a groove and a land; and Tavg=(3T1c+T1a)/4 when the system records information on only one of a groove and a land.

An upper bound for the average optical transmittance range depends on the thickness of the first phase change recording material layer 10. The first information recording section 5 is requested to have a high optical transmittance in order to enable recording and reproduction in the second information recording section 3. To increase the optical transmittance of the first information recording section 5, it just needs to thin the first phase change recording material layer 10. If the first phase change recording material layer 10 becomes 5 nm thick or less, however, the phase change recording material scatters, configuring no layer. Accordingly, the first phase change recording material layer 10 needs to be 5 nm thick or more. In this case, it is known that Tavg≦70%.

A lower bound for the average optical transmittance can be found from the necessity for approximate equality among optical reflectances, recording powers, and reproduction powers of the first information recording section 5 and the second information recording section 3 viewed from the recording and reproducing apparatus. When the optical transmittance of the first information recording section 5 is decreased, the reflected light intensity from the second information recording section 3 decreases in proportion to the square of the optical transmittance for the first information recording section 5. In order to balance reflected light intensities from the first information recording section 5 and the second information recording section 3, it is necessary to decrease the optical reflectance of the first information recording section 5. When the optical reflectance of the first information recording section 5 is decreased excessively, the recording and reproducing apparatus degrades the capability of detecting information from the reflected light, the focus servo capability, and the tracking servo capability. In this case, it is difficult to increase the incident light intensity to the optical disc 1 during information reproduction for increasing the reflected light intensity. This is because excessively increasing the incident light intensity during information reproduction increases the temperature and advances the crystallization to erase an amorphous recording mark, i.e., the recorded information signal is lost. For the above-mentioned reason, it is found that the optical reflectance of the first information recording section 5 indicates the lower bound of approximately 5% by averaging the optical reflectance (R1c) in a crystalline state of the phase change recording material and optical reflectance (R1a) in an amorphous state thereof. When exclusively considering the second information recording section 3, the optical reflectance can be up to approximately 30% by averaging optical reflectance (R2c) in a crystalline state of the phase change recording material and optical reflectance (R2a) in an amorphous state thereof. Accordingly, equation 4 below can be used to determine the lowerbound of the average optical transmittance for the first information recording section 5.

$$30\% \times (\text{lower bound of the average optical transmittance for the first information recording section } 5)^2 = 5\% \qquad \text{Equation 4}$$

Equation 4 yields (lower bound of the average optical transmittance for the first information recording section 5)=40%, i.e., 40%≦Tavg.

Figure 6:
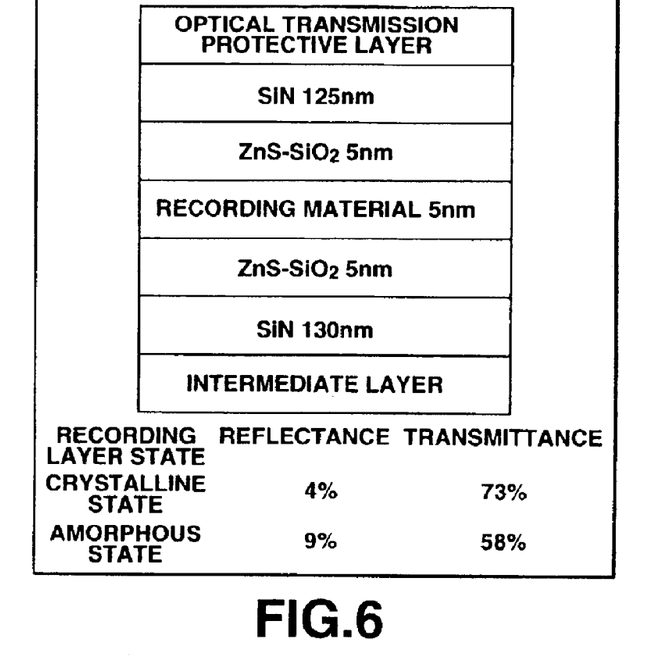
FIG. 6 schematically shows an example of a layer configuration of the first information recording section with a high optical transmittance.
Figure 7:
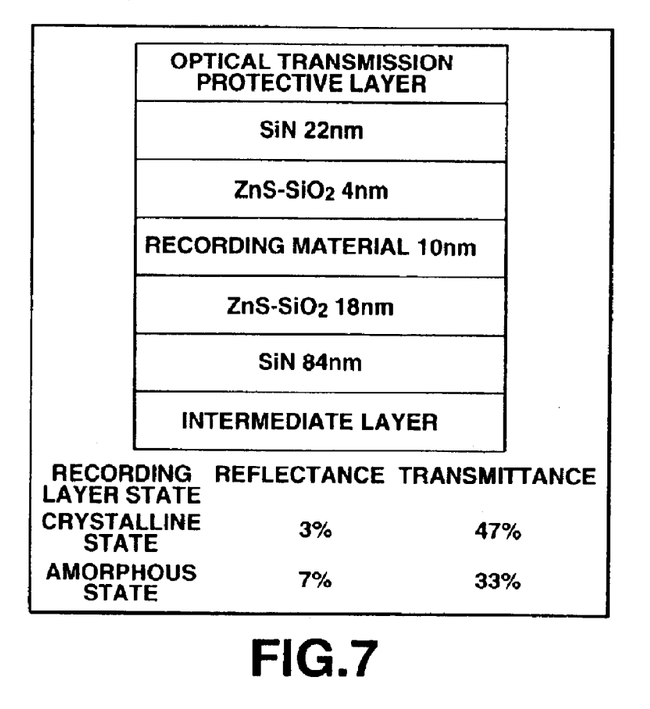
FIG. 7 schematically shows an example of a layer configuration of the first information recording section with a low optical transmittance.
Figure 8:
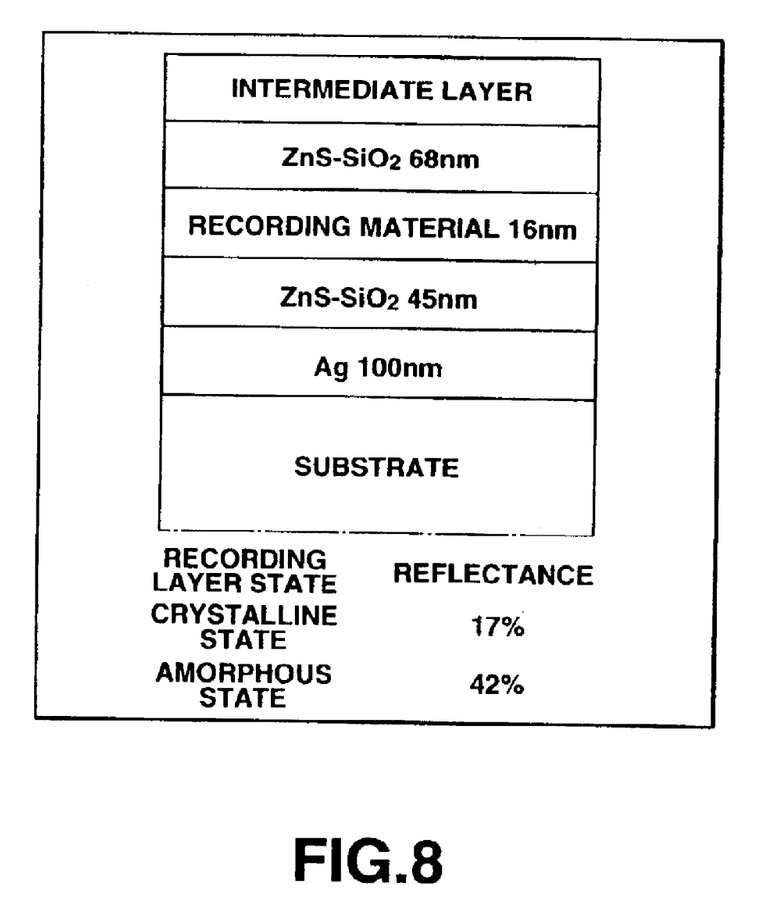
FIG. 8 schematically shows an example of a layer configuration of the second information recording section with a high optical reflectance.

FIGS. 6 through 8 show layer configuration examples for the first information recording section 5 and the second information recording section 3. FIG. 6 shows The layer configuration for the first information recording section 5 having a high optical transmittance. This layer configuration yields Tavg=65.1% and (R1a+R1c)/2=6.5%. FIG. 7 shows the layer configuration for the first information recording section 5 having a low optical transmittance. This layer configuration yields Tavg=40% and (R1a+R1c)/2=5%. FIG. 8 shows the layer configuration for the second information recording section 3 having a high optical transmittance. This layer configuration yields (R2a+R2c)/2=29.5%.

It is desirable that the first information recording section 5 provides the relationship as formulated by the following equation 5 between light absorption coefficient (A1a) in an amorphous state of the phase change recording material and light absorption coefficient (A1c) in a crystalline state thereof.

$$1.7 \geq A1c/A1a \geq 0.8 \qquad \text{Equation 5}$$

To form an amorphous recording mark on the first phase change recording material layer 10, the laser is irradiated to the first phase change recording material layer 10 to raise the temperature and melt the material. When the laser irradiation stops to enter a process of cooling the phase change recording material, the recrystallization begins around the melting region and advances to its center. Since the center of the melting region cools faster than the periphery thereof, an amorphous recording mark is formed after completion of the cooling process.

Figure 9:
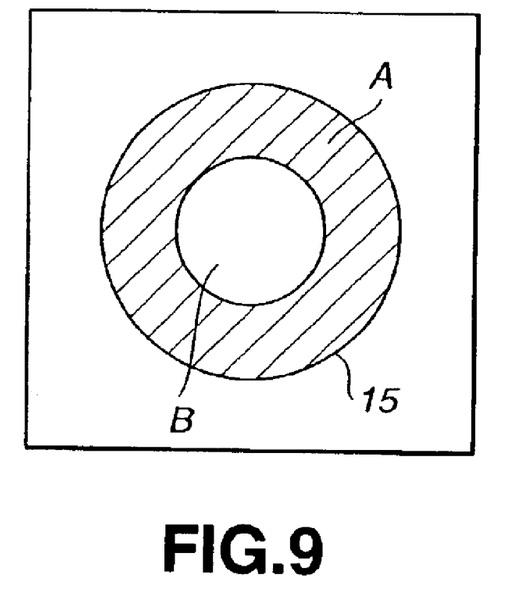
FIG. 9 schematically shows a phase change recording material having a high light absorption coefficient and a wide melting region.
Figure 10:
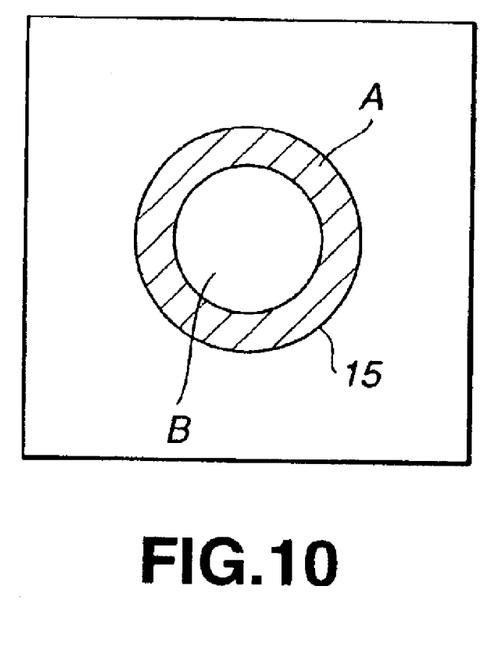
FIG. 10 schematically shows a phase change recording material having a low light absorption coefficient and a narrow melting region.

In this case, when the first phase change recording material layer 10 requires a large amount of light absorption, it is melted to cause a high ultimate temperature. As shown in FIG. 9, the melting region widens and a recrystallization region A also widens. When the first phase change recording material layer 10 requires a small amount of light absorption, it is melted to cause a low ultimate temperature. As shown in FIG. 10, the melting region narrows and the recrystallization region A also narrows. The amorphous recording mark regions in both cases can be approximately equalized by controlling the laser irradiation in the last result.

Here, the melting region indicates all of the inside of a melting boundary 15 in FIGS. 9 and 10. An amorphous recording mark B is formed inside the recrystallization region A as shown in FIGS. 9 and 10.

When A1c/A1a<1, the amorphous recording mark shows a higher light absorption coefficient than the crystallization region and easily raises the temperature. When the amorphous recording mark is rewritten, both the melting region and the recrystallization region are widened as shown in FIG. 9. When the crystallization region is rewritten, both the melting region and the recrystallization region are narrowed as shown in FIG. 10. When the material of composition Ge:Sb:Te=2:2:5 is used to form the phase change recording material layer, it is necessary to satisfy the condition A1c/A1a≧1. However, a fast crystallization speed results from a material which uses Sb and Te as major components and has the atomic ratio of 2.3<Sb/Te≦4.0. This material may follow the condition A1c/A1a<1 because it is subject to a smaller effect of the light absorption coefficient than the material of composition Ge:Sb:Te=2:2:5.

The condition A1c/A1a<0.8 makes rewriting difficult for the following reason. When information is overwritten to the first information recording section 5 which already records an information signal, a temperature rise progresses at the amorphous recording mark to fully melt it. However, the crystallization region has a low light absorption coefficient, prevents a temperature rise from progressing, causes insufficient melting, and cannot form an amorphous recording mark. Accordingly, the condition A1c/A1a≧0.8 is required.

In addition, the condition A1c/A1a>1.7 also makes rewriting difficult for a reason opposite that for the above-mentioned condition A1c/A1a<0.8. Namely, when information is overwritten to the section which already records an information signal, a temperature rise progresses at the crystallization region to fully melt it. However, the amorphous recording mark has a low light absorption coefficient, prevents a temperature rise from progressing, causes insufficient melting, and therefore cannot be formed. Accordingly, the condition A1c/A1a≦1.7 is required.

Figure 11:
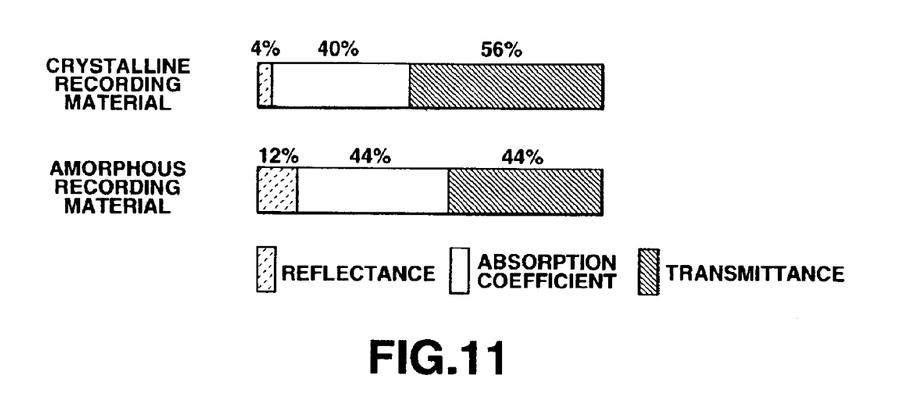
FIG. 11 schematically shows Low-to-High optical energy distribution.
Figure 12:
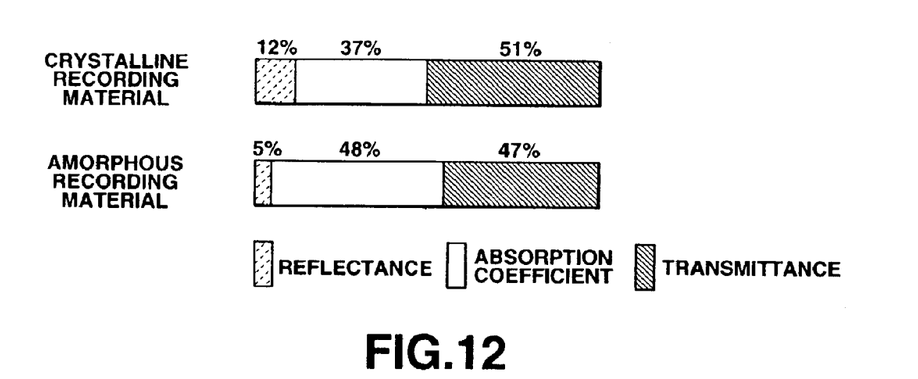
FIG. 12 schematically shows High-to-Low optical energy distribution.

It is desirable to use the first information recording section 5 of Low-to-High type which causes the optical reflectance in an amorphous state of the phase change recording material to be higher than that in a crystalline state thereof. It is possible to implement A1c/A1a≧0.8 by using the first information recording section 5 of Low-to-High type. FIGS. 11 and 12 show energy distributions used for reflecting, absorbing, and transmitting optical energy incident on the first information recording section 5. According to FIGS. 11 and 12, the absorption coefficient for the amorphous state is higher than that for the crystalline state. It is obvious that the High-to-Low type can decrease a difference of these absorption coefficients. As a simulation result, it has been found that the High-to-Low type makes the implementation of A1c/A1a≧0.8 difficult and the Low-to-High type can implement it.

The second information recording section 3 will now be described. Like the first information recording section 5, it is desirable that the second information recording section 3 contain a phase change recording material layer formed of a phase change recording material which uses Sb and Te as major components and has the atomic ratio of 2.3<Sb/Te≦4.0.

Figure 13:
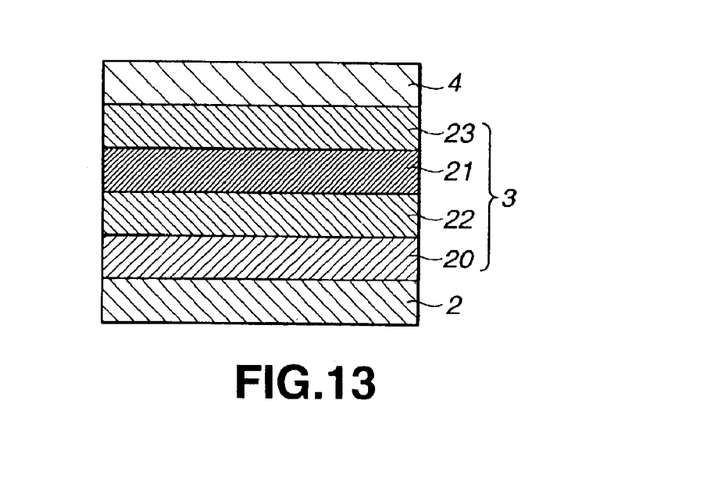
FIG. 13 is a sectional view showing another example of the layer configuration of the second information recording section.

FIG. 13 shows a configuration example of the second information recording section 3. According to the example shown in FIG. 13, there are formed, on a reflective layer 20, a third dielectric layer 22 to the support substrate 2 and a fourth dielectric layer 23 to the intermediate layer 4 with a second phase change recording material layer 21 therebetween.

A configuration of the second information recording section 3 is not limited to that shown in FIG. 13. Conventionally known materials can be used to form the reflective layer 20, the third dielectric layer 22, and the fourth dielectric layer 23.

The second phase change recording material layer 21 is formed of a material which uses Sb and Te as major components and has the atomic ratio is 2.3<Sb/Te≦4.0. When this material is used to form the phase change recording material layer 21, the optical disc 1 can provide a transfer rate of 30 Mbps or more.

Conventionally known materials can be used to form the support substrate 2, the intermediate layer 4, and the optical transmission protective layer 6 of the optical disc 1.

Figure 14:
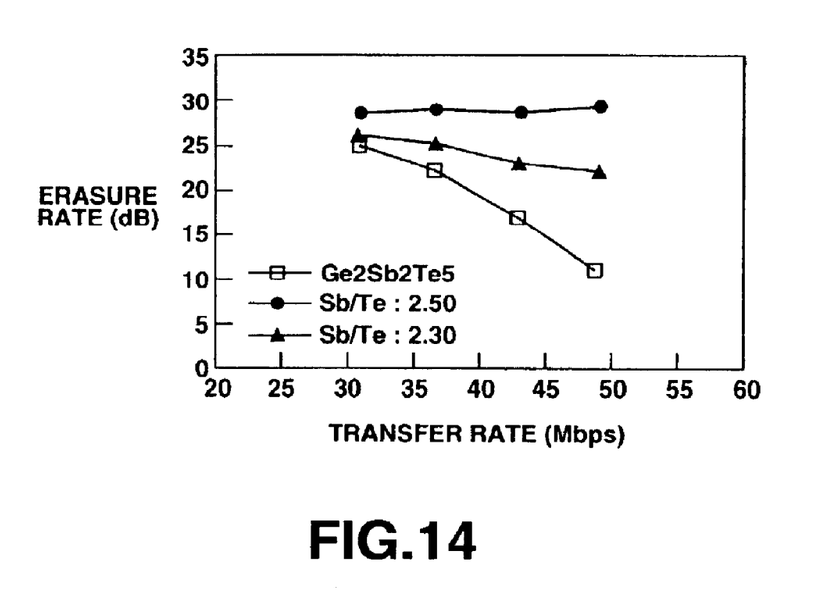
FIG. 14 shows the relationship between a transfer rate and an erasure rate when the phase change recording material layer is formed of different materials.

FIG. 14 shows the relationship between a transfer rate and an erasure rate when the phase change recording material layer is formed of a material which uses Sb ad Te as major components. We measured the relationship between a transfer rate and an erasure rate using an optical disc formed by sequentially layering, on a support substrate, $Si_3N_4$, ZnS—$SiO_2$, a phase change recording material layer (made of a material using Sb and Te as major components and with addition of a small amount of Ge), ZnS—$SiO_2$, $Si_3N_4$, and an optical transmission protective layer formed thereon. In FIG. 14, the abscissa indicates a transfer rate and the ordinate indicates an erasure rate. Table 4 below lists optical characteristics in this case. Table 5 below shows measurement conditions.

TABLE 4

| | |
|---|---|
| Optical reflectance for crystalline state | 3% |
| Optical reflectance for amorphous state | 10% |
| Transmittance for crystalline state | 59% |
| Transmittance for amorphous state | 42% |

TABLE 5

| | |
|---|---|
| Laser wavelength | 407 nm |
| Objective lens NA | 0.85 |
| Signal modulation system | 1–7 system |
| Information recording line density | 0.13 μm/bit |
| Data ultilization | 80% |
| Recording powder and Write Strategy | Optimal condition used for each transfer rate |

As shown in FIG. 14, when the phase change recording material layer is formed of a material with Sb/Te=2.5, it is possible to provide the erasure rate of 26 dB or more even at the transfer rate of 30 Mbps or more. Information signals can be rewritten sufficiently.

When the phase change recording material layer is formed of a material with Sb/Te=2.3, the transfer rate of 30 Mbps or more causes the erasure rate to be less than 26 dB, making information signal rewriting insufficient. It is considered that the condition Sb/Te≦2.3 nullifies the eutectic composition. Accordingly, the first phase change recording material layer 10 needs to be formed of a material satisfying the condition Sb/Te>2.3.

Since the ratio of Sb increases in the case of Sb/Te>4.0, the first phase change recording material layer 10 easily crystallizes even at room temperature. That is, in the case of Sb/Te>4.0, the amorphous recording mark easily vanishes at room temperature. Accordingly, the first phase change recording material layer 10 needs to be formed of a material satisfying the condition Sb/Te≦4.0.

When the phase change recording material layer is formed by adding In, Zn, Sn, Ag, and Au instead of Ge to a material with Sb/Te=2.5, it is also possible to ensure the transfer rate of 30 Mbps or more and the erasure rate of 26 dB or more. Information signals can be rewritten sufficiently.

Figure 15:
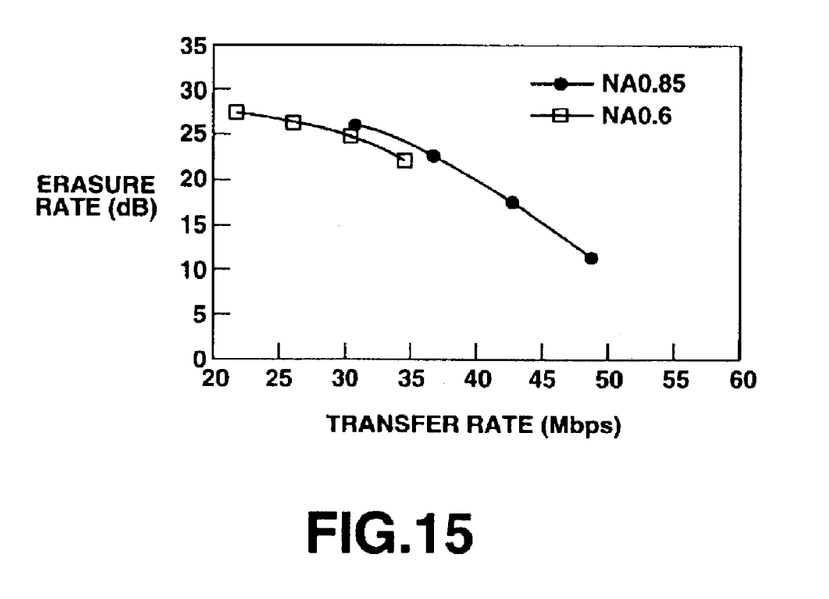
FIG. 15 shows the relationship between a transfer rate and an erasure rate for each objective lens NA when the phase change recording material layer is formed of a material of Ge:Te:Sb=2:2:5.

FIG. 15 shows the relationship between a transfer rate and an erasure rate when the phase change recording material layer is formed of a material with the composition of Ge:Sb:Te=2:2:5. We measured the relationship between a transfer rate and an erasure rate using an optical disc formed by sequentially layering, on a support substrate, $Si_3N_4$, ZnS—$SiO_2$, GeSbTe, ZnS—$SiO_2$, $Si_3N_4$, and an optical transmission protective layer formed thereon. In FIG. 15, the abscissa indicates a transfer rate and the ordinate indicates an erasure rate. Table 6 below lists optical characteristics in this case. Table 7 below shows measurement conditions.

TABLE 6

| | |
|---|---|
| Optical reflectance for crystalline state | 10% |
| Optical reflectance for amorphous state | 3% |
| Transmittance for crystalline | 49% |
| Transmittance for amorphous state | 50% |

TABLE 7

| | | |
|---|---|---|
| Laser wavelength | 407 μm | |
| Signal modulation system | 1–7 modulation system NRZI | |
| Data utilization | 80% | |
| Objective lens NA | 0.6 | 0.85 |
| Information recording line density | 0.184 μm/bit | 0.13 μm/bit |
| Recording power and Write Strategy | Optimal condition used for each transfer rate and NA | |

As shown in FIG. 15, when the phase change recording material layer is formed of a material with Ge:Sb:Te=2:2:5, the erasure rate becomes less than 26 dB at the transfer rate of 30 Mbps or more independently of numerical apertures of the objective lens. This makes information signal rewriting insufficient.

Accordingly, when the phase change recording material layer is formed of a material which uses Sb and Te as major components, has the atomic ratio of 2.3<Sb/Te≦4.0, and complies with the eutectic composition, it is possible to stably perform recording, reproducing, and rewriting operations for the phase change recording material layer at a high transfer rate of 30 Mbps or more.

As mentioned above, the optical disc 1 embodying the present invention includes a phase change recording material layer formed of a material which uses Sb and Te as major components and has the atomic ratio of 2.3<Sb/Te≦4.0. The phase change recording material provides a fast crystallization speed. Accordingly, even when the laser with a short wavelength is used for recording and reproduction and the objective lens has a high NA, it is possible to stably perform recording, reproducing, and rewriting operations at a high transfer rate for the information recording section.

Stable recording and reproducing operations become available, for example, under a condition that the laser wavelength is set to 385 nm through 450 nm; the objective lens NA is set to 0.85; and the transfer rate is set to 30 Mbps or more. It is possible to handle 35 Gbytes or more of information on a single optical disc.

Industrial Applicability

The multilayer optical disc according to the present invention includes the information recording section having the phase change recording material layer formed of the phase change recording material which comprises at least Sb and Te as major components and satisfies their ratio of 2.3<Sb/Te≦4.0 according to the atomic ratio. The phase change recording material provides a fast crystallization speed. Accordingly, even when the laser with a short wavelength is used for recording and reproduction and the objective lens has a high numerical aperture, it is possible to stably perform recording, reproducing, and rewriting operations at a high transfer rate for the information recording section.

We claim:

1. A multilayer optical disc comprising at least a first information recording section, an intermediate layer having optical permeability, and a second information recording section sequentially formed on a substrate and using laser irradiated from a side of the first information recording section, wherein the first information recording section includes a phase change recording material layer formed of a phase change recording material which uses at least Sb and Te as major components and satisfies their ratio of 2.3<Sb/Te≦4.0 according to the atomic ratio.

2. The multilayer optical disc according to claim 1, wherein the laser has a wavelength of 385 nm or more and 450 nm or less.

3. The multilayer optical disc according to claim 1, wherein the second information recording section includes a phase change recording material layer formed of a phase change recording material which uses at least Sb and Te as major components and satisfies their ratio of 2.3<Sb/Te≦4.0 according to the atomic ratio.

4. The multilayer optical disc according to claim 1, wherein at least one of Ge, In, Zn, Sn, Ag, and Au is added to the phase change recording material layer.

5. The multilayer optical disc according to claim 1, wherein the first information recording section includes the phase change recording material layer configured to be sandwiched between a pair of dielectric layers having optical permeability.

6. The multilayer optical disc according to claim 5, wherein at least one of the pair of dielectric layers is a single layer including at least a dielectric material having a higher thermal conductivity than ZnS—SiO$_2$, or a multilayer of the dielectric material having the high thermal conductivity and another transparent dielectric material.

7. The multilayer optical disc according to claim 6, wherein the dielectric material having the high thermal conductivity contains at least one of Si$_3$N$_4$, AlN, SiC, BeO, and BN as a major component.

8. The multilayer optical disc according to claim 1, wherein, when information is recorded on all recording tracks, the first information recording section is provided with an average transmittance (Tavg) satisfying equation 1 below.

$$70\% \geq Tavg \geq 40\% \qquad \text{Equation 1}$$

9. The multilayer optical disc according to claim 1, wherein the phase change recording material is provided with a light absorption coefficient (A1c) for the first information recording section in a crystalline state and a light absorption coefficient (A1a) for the first information recording section in an amorphous state satisfying equation 2 below.

$$1.7 \geq A1c/A1a \geq 0.8 \qquad \text{Equation 2}$$

10. The multilayer optical disc according to claim 1, wherein the phase change recording material is provided with a higher optical reflectance for the first information recording section in an amorphous state than that for first information recording section in a crystalline state.

* * * * *